US009827747B2

(12) United States Patent
Maekawa et al.

(10) Patent No.: US 9,827,747 B2
(45) Date of Patent: Nov. 28, 2017

(54) MULTI-LAYER FILM, DECORATIVE MOLDING FILM AND MOLDED BODY

(71) Applicants: TEIJIN LIMITED, Osaka (JP); NISSHA PRINTING CO., LTD., Kyoto (JP)

(72) Inventors: Shoichi Maekawa, Tokyo (JP); Junichi Shibata, Tokyo (JP); Takeshi Nishimura, Kyoto (JP); Shuichi Taya, Kyoto (JP)

(73) Assignees: TEIJIN LIMITED, Osaka (JP); NISSHA PRINTING CO., LTD., Kyoto (JP)

( * ) Notice: Subject to any disclaimer, the term of this patent is extended or adjusted under 35 U.S.C. 154(b) by 450 days.

(21) Appl. No.: 14/419,320

(22) PCT Filed: Aug. 2, 2013

(86) PCT No.: PCT/JP2013/071582
§ 371 (c)(1),
(2) Date: Feb. 3, 2015

(87) PCT Pub. No.: WO2014/025005
PCT Pub. Date: Feb. 13, 2014

(65) Prior Publication Data

US 2015/0217541 A1 Aug. 6, 2015

(30) Foreign Application Priority Data

Aug. 6, 2012 (JP) ................................ 2012-174025

(51) Int. Cl.

| | |
|---|---|
| ***B32B 27/08*** | (2006.01) |
| ***B32B 3/10*** | (2006.01) |
| ***B29C 47/06*** | (2006.01) |
| ***B32B 27/30*** | (2006.01) |
| ***B32B 27/36*** | (2006.01) |
| ***B29C 47/00*** | (2006.01) |
| ***B29B 11/14*** | (2006.01) |
| *B29K 33/00* | (2006.01) |
| *B29K 69/00* | (2006.01) |

(52) U.S. Cl.
CPC .............. *B32B 27/08* (2013.01); *B29B 11/14* (2013.01); *B29C 47/0021* (2013.01); *B29C 47/0061* (2013.01); *B29C 47/06* (2013.01); *B29C 47/065* (2013.01); *B32B 3/10* (2013.01); *B32B 27/30* (2013.01); *B32B 27/308* (2013.01); *B32B 27/36* (2013.01); *B32B 27/365* (2013.01); *B29K 2033/08* (2013.01); *B29K 2069/00* (2013.01); *B32B 2250/03* (2013.01); *B32B 2250/24* (2013.01); *B32B 2307/306* (2013.01); *B32B 2307/536* (2013.01); *B32B 2451/00* (2013.01); *Y10T 428/2495* (2015.01); *Y10T 428/24802* (2015.01)

(58) Field of Classification Search
CPC ........................ B32B 27/08; Y10T 428/24802
See application file for complete search history.

(56) References Cited

U.S. PATENT DOCUMENTS

| | | | | |
|---|---|---|---|---|
| 8,945,704 | B2 * | 2/2015 | Shibata .................. | B32B 27/08 428/212 |
| 2009/0246482 | A1 | 10/2009 | Sugimura et al. | |
| 2009/0252935 | A1 | 10/2009 | Koyama et al. | |
| 2009/0252936 | A1 | 10/2009 | Sugimura et al. | |
| 2012/0013045 | A1 | 1/2012 | Sugimura et al. | |

FOREIGN PATENT DOCUMENTS

| | | | |
|---|---|---|---|
| EP | 2 468 501 | 6/2012 | |
| EP | 2 578 636 | 4/2013 | |
| EP | 2 602 108 | 6/2013 | |
| JP | 3457514 | 10/2003 | |
| JP | 3489972 | 1/2004 | |
| JP | 2005-219330 | 8/2005 | |
| JP | 2005-231257 | 9/2005 | |
| JP | 3904262 | 4/2007 | |
| JP | 2007-160892 | 6/2007 | |
| JP | 2009-172953 | 8/2009 | |
| JP | 2009-234183 | 10/2009 | |
| JP | 2009-234184 | 10/2009 | |
| JP | 2009-248363 | 10/2009 | |
| JP | 2012-131077 | 7/2012 | |
| JP | 5331938 | 10/2013 | |
| JP | 2014051649 A * | 3/2014 | |
| WO | WO 2012018099 A1 * | 2/2012 | ............ B32B 27/08 |

OTHER PUBLICATIONS

European Search Report issued Jun. 22, 2015 in corresponding European Application No. 13828375.9.
International Preliminary Report on Patentability dated Feb. 10, 2015 in International (PCT) Application No. PCT/JP2013/071582.
International Search Report dated Nov. 5, 2013 in International (PCT) Application No. PCT/JP2013/071582.

* cited by examiner

*Primary Examiner* — Gerard Higgins
(74) *Attorney, Agent, or Firm* — Wenderoth, Lind & Ponack, L.L.P.

(57) ABSTRACT

A multi-layer film having excellent surface hardness and transparency, a small heat shrinkage factor and such high brittleness that it is easily trimmed after decorative molding. The multi-layer film comprises a layer (layer A) which contains a polycarbonate resin having a viscosity average molecular weight of 13,000 or more to less than 20,000 and layers (layer B-1 and layer B-2) which contain an acrylic resin and are formed on both sides of the layer A, respectively, wherein the total thickness of the multi-layer film is 50 to 200 μm, and the thickness of the layer A accounts for 5 to 30 $ of the total thickness.

7 Claims, No Drawings

MULTI-LAYER FILM, DECORATIVE MOLDING FILM AND MOLDED BODY

TECHNICAL FIELD

The present invention relates to a multi-layer film used for the surface decoration of a molded product and a molded body thereof.

BACKGROUND ART

Decorative molding techniques such as in-mold transfer, in-mold lamination and vacuum pressure molding lamination have been used for home electric appliances, auto interior parts and miscellaneous goods, and application ranges thereof are widely expanding due to growing environmental awareness and advances in technical innovations in recent years. Decorative molding films obtained by carrying out printing, shaping or metal deposition on a film are used for decorative molding. Acrylic films, PET films and polycarbonate films have been used as base films for these.

Characteristic properties required for the base films include thermoformability that ensures a target shape to be accurately transferred, solvent resistance required for the decoration of the surface of a film such as printing, surface hardness, heat resistance, transparency and weather resistance. However, there is no substrate which satisfies all the above requirements, and the above films have been used according to purpose while they sustain problems.

For example, acrylic films are often used for the purpose of the present invention due to their excellent trimming properties in a specific decorative molding method since they have excellent transparency and weather resistance and such high brittleness that they are easily broken. However, there is limitation to the use of the films for purposes in which high heat resistance is required, and it is difficult to use the acrylic films in fields in which high heat resistance is required while cracking ease at the time of trimming is retained.

In the case of polycarbonate films, although they have high heat resistance, they have higher ductility than the acrylic films so that they are hardly broken, whereby they are inferior in trimming properties.

As one of measures for improving the characteristic properties of the substrate, there is proposed a multi-layer film having an acrylic resin layer on at least one side of a polycarbonate resin layer (Patent Documents 1 to 10).

This multi-layer film improves the heat resistance of the acrylic film and also the surface hardness, solvent resistance and weather resistance of the polycarbonate film. Thus, it is aimed to obtain good balance among properties by making use of the advantages of these films. However, this multi-layer film is not satisfactory in terms of trimming properties and surface hardness as compared with an acrylic single-layer film, and its thermoformability and appearance and transparency after molding have often come into question.

Although various studies have been made to improve the characteristic properties of the multi-layer film as a substrate for a decorative molding film from the viewpoints of the improvement of raw materials and the constitution of a laminate, the multi-layer film is not satisfactory yet and the further improvement of the film is desired.

(Patent Document 1) U.S. Pat. No. 3,457,514
(Patent Document 2) U.S. Pat. No. 3,489,972
(Patent Document 3) U.S. Pat. No. 3,904,262
(Patent Document 4) JP-A 2005-231257
(Patent Document 5) JP-A 2005-219330

(Patent Document 7) JP-A 2009-172953
(Patent Document 8) JP-A 2009-234183
(Patent Document 9) JP-A 2009-234184
(Patent Document 10) JP-A 2009-248363

DISCLOSURE OF THE INVENTION

It is an object of the present invention to provide a multi-layer film which has excellent heat resistance, surface hardness and transparency, a small heat shrinkage factor and high brittleness and is easily trimmed after decorative molding. It is another object of the present invention to provide a decorative molding film obtained by using the multi-layer film and a decorative molded body. It is still another object of the present invention to provide a process of producing the multi-layer film.

The inventors of the present invention conducted intensive studies on the raw material of a polycarbonate resin layer and the thickness constitution of the polycarbonate resin layer and an acrylic resin layer for a multi-layer film having the polycarbonate resin layer and the acrylic resin layer. As a result, they found that a multi-layer film having excellent heat resistance, transparency, surface hardness and trimming properties and a low heat shrinkage factor is obtained by forming a polycarbonate resin layer (layer A) having a viscosity average molecular weight of 13,000 or more to less than 20,000 and acrylic resin layers (layer B-1 and layer B-2) on both sides of the layer A, respectively, and adjusting the thickness ratio of the layer A to 5 to 30% of the total thickness. The present invention was accomplished based on this finding.

That is, the present invention is as follows.

1. A multi-layer film comprising a layer (layer A) containing a polycarbonate resin having a viscosity average molecular weight of 13,000 or more to less than 20,000 and layers (layer B-1 and layer B-2) containing an acrylic resin formed on both sides of the layer A, respectively, wherein the total thickness of the multi-layer film is 50 to 200 μm, and the thickness of the layer A accounts for 5 to 30% of the total thickness.
2. The multi-layer film in the above paragraph 1 having a haze of 4% or less.
3. A decorative molding film obtained by decorating one side of the multi-layer film of the above paragraph 1 or 2.
4. A decorative molded body containing a substrate and the decorative molding film of the above paragraph 3 which is formed on the surface of the substrate.
5. A process of producing the multi-layer film of the above paragraph 1 having layers B-1 and B-2 on both sides of a layer A, respectively, comprising the step of:

coextruding a molding material A which constitutes the layer A and contains a polycarbonate resin having a viscosity average molecular weight of 13,000 or more to less than 20,000, a molding material B-1 which constitutes the layer B-1 and contains an acrylic resin and a molding material B-2 which constitutes the layer B-2 and contains an acrylic resin.

BEST MODE FOR CARRYING OUT THE INVENTION

The present invention is described in detail hereinunder.

[Multi-Layer Film]

The multi-layer film of the present invention has a layer (layer A) containing a polycarbonate resin and layers (layer B-1 and layer B-2) containing an acrylic resin. That is, the multi-layer film is obtained by forming the layer B-1 and the layer B-2 on the both sides of the layer A, respectively.

<Polycarbonate Resin>

The polycarbonate resin is a polymer in which a dihydroxy compound is bonded by a carbonate bond and generally obtained by reacting a dihydroxy component with a carbonate precursor by interfacial polymerization or melt polymerization.

Typical examples of the dihydroxy component include 2,2-bis(4-hydroxyphenyl) propane (commonly known as "bisphenol A"), 2,2-bis{(4-hydroxy-3-methyl) phenyl}propane, 2,2-bis(4-hydroxyphenyl) butane, 2,2-bis (4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)cyclohexane, 1,1-bis(4-hydroxyphenyl)-3,3,5-trimethylcyclohexane, 1,1-bis (4-hydroxyphenyl) octane, 1,1-bis(4-hydroxyphenyl) decane, 9,9-bis{(4-hydroxy-3-methyl)phenyl}fluorene, 9,9-bis(4-hydroxyphenyl) fluorene, α',α'-bis(4-hydroxyphenyl)-m-diisopropylbezene, isosorbide, 1,3-propanediol, 1,4-butanediol and 1,6-hexanediol. It may be a homopolymer of any one of them or a copolymer of two or more of them. Bisphenol A is preferred from the viewpoints of physical properties and cost. In the present invention, a polycarbonate comprising bisphenol A in an amount of preferably 50 mol % or more, more preferably 60 mol % or more, much more preferably 90 mol % or more based on the total of all bisphenol components is used.

Specific examples of the polycarbonate include a homopolymer of bisphenol A, a copolymer of bisphenol A and 1,1-bis(4-hydroxyphenyl)-3,3,5-trimethylcyclohexane, and a copolymer of bisphenol A and 9,9-bis{(4-hydroxy-3-methyl)phenyl}fluorene. A homopolymer of bisphenol A is most preferred.

The glass transition temperature of the polycarbonate resin is preferably 100 to 200° C., more preferably 120 to 180° C., much more preferably 135 to 150° C. When the glass transition temperature is too high, the melt viscosity of the polycarbonate resin becomes too high, thereby making it difficult to carry out melt film formation. When the glass transition temperature is too low, the heat resistance of the obtained multi-layer film becomes unsatisfactory, which is not preferred for the intended purpose of the present invention.

As the carbonate precursor is used a carbonyl halide, carbonate ester or haloformate, as exemplified by phosgene, diphenyl carbonate and dihaloformates of a dihydric phenol.

To produce the polycarbonate resin by reacting the above divalent dihydroxy compound with the carbonate precursor by interfacial polycondensation or melt polymerization, a catalyst, a terminating agent and an antioxidant for a dihydric phenol may be used as required. The polycarbonate resin may be a branched polycarbonate resin obtained by copolymerizing a polyfunctional aromatic compound having 3 or more functional groups, or a polyester carbonate resin obtained by copolymerizing an aromatic or aliphatic bifunctional carboxylic acid. It may also be a mixture of two or more obtained polycarbonate resins.

The molecular weight of the polycarbonate resin is preferably 13,000 or more to less than 20,000 in terms of viscosity average molecular weight. When the molecular weight is lower than 13,000, the melt viscosity becomes too low, thereby making it difficult to carry out melt film formation. When the molecular weight is 20,000 or more, the toughness of a multi-layer film becomes high, thereby making it difficult to trim the multi-layer film after decorative molding. The molecular weight is preferably 14,000 to 19,000, more preferably 15,000 to 18,500. When a mixture of two or more polycarbonate resins is used, the molecular weight is the molecular weight of the entire mixture. The viscosity average molecular weight (Mv) as used herein is obtained by measuring the specific viscosity ($\eta_{sp}$) of a solution containing 0.7 g of the polycarbonate dissolved in 100 ml of methylene chloride at 20° C. and inserting it into the following equation.

$$\eta_{sp}/c=[\eta]+0.45\times[\eta]^2c$$

$$[\eta]=1.23\times10^{-4}M^{0.83}$$

(c=0.7 g/dL, [η] is an intrinsic viscosity)

General additives such as a heat stabilizer, ultraviolet absorbent, light-resistant stabilizer, colorant, release agent, lubricant and antistatic agent may be added to the polycarbonate resin.

<Acrylic Resin>

In the present invention, the acrylic resin for the layer B-1 and the layer B-2 is essentially composed of a polymer of a methacrylic acid ester or an acrylic acid ester. The acrylic resin is, for example, a homopolymer of methyl methacrylate, or a copolymer containing preferably 50 wt % or more, more preferably 70 wt % or more, much more preferably 80 wt % or more of methyl methacrylate.

Examples of another comonomer include ethyl methacrylate, butyl methacrylate, 2-ethylhexyl methacrylate, methyl acrylate, ethyl acrylate, butyl acrylate and 2-ethylhexyl acrylate.

Still another comonomer is an ethylenically unsaturated monomer. Examples thereof include vinyl aromatic compounds such as styrene, α-methylstyrene and vinyl toluene, diene-based compounds such as 1,3-butadiene and isoprene, alkenyl cyan compounds such as acrylonitrile and methacrylonitrile, acrylic acid, methacrylic acid, maleic anhydride and N-substituted maleimide. They may be used alone or in combination of two or more. The content of the comonomer is preferably 0 to 50 wt %, more preferably 0 to 30 wt %, much more preferably 0 to 20 wt %.

The production processes of the acrylic resin are roughly divided into emulsion polymerization, suspension polymerization and continuous polymerization. The acrylic resin used in the present invention may be produced by any one of the above polymerization processes.

As long as the effect of the present invention is not impaired, rubber particles may be added to the acrylic resin in order to improve burring and cracking during the thermoforming of the multi-layer film. The improvement of toughness by adding rubber particles to the acrylic resin is a known and widely used technique and may be employed in the present invention. In general, when the rubber particles are added, transparency tends to lower. Therefore, it is preferred that rubber particles having as high transparency as possible should be used in the present invention. Preferred examples of the rubber particles include rubber particles having a core-shell structure prepared by covering a core layer of an acrylic crosslinked elastic polymer with a methacrylic acid ester resin and rubber particles having a three-layer structure prepared by covering the methacrylic acid ester resin of the center part with an acrylic crosslinked elastic polymer and further with a methacrylic acid ester resin. These rubber particles having a multi-layer structure have high dispersibility in an acrylic resin and make it possible to obtain a multi-layer film having high transparency. In the present invention, the existence and nonexistence of rubber particles and the type, amount and size of the rubber particles when the rubber particles are contained should be determined by taking into consideration toughness and transparency required for abase film at the time of decorative molding in a comprehensive manner.

General additives such as a heat stabilizer, ultraviolet absorbent, light-resistant stabilizer, colorant, release agent, lubricant, antistatic agent and delusterant may be added to the acrylic resin.

<Layer Constitution>

The multi-layer film of the present invention has a total thickness of 50 to 200 μm, preferably 50 to 150 μm, more preferably 60 to 130 μm. When the total thickness is too small, it is difficult to handle the film, the film is not suitable for use as a decorative film, and its production becomes difficult. When the total thickness is too large, it takes time to heat the film at the time of thermoforming, or thermoformability may deteriorate disadvantageously.

As for the preferred thickness constitution of the multi-layer film of the present invention, the thickness of the layer A accounts for 5 to 30% of the total thickness. More preferably, the thickness of the layer A accounts for 10 to 25% of the total thickness. When the thickness of the layer A accounts for less than 5%, the multi-layer film deteriorates in heat resistance and heat shrinkage factor and when the thickness of the layer A accounts for more than 30%, the multi-layer film deteriorates in trimming properties disadvantageously.

The thickness of each of the layer B-1 and the layer B-2 is preferably 20 μm or more. When the thickness of each of the layer B-1 and the layer B-2 is smaller than 20 μm, surface hardness and solvent resistance become unsatisfactory disadvantageously. The thickness of each of the layer B-1 and the layer B-2 is more preferably 30 μm or more, much more preferably 40 μm or more. The upper limit of the thickness of each of the layer B-1 and the layer B-2 which is determined by the total thickness and the thickness of the layer A is preferably 90 μm or less, more preferably 70 μm or less.

Preferably, the base film of the decorative molding film has high transparency. The multi-layer film of the present invention has a total light transmittance of preferably 90% or more, more preferably 91% or more. The multi-layer film has a haze of preferably 4% or less, more preferably 3% or less, much more preferably 2% or less, particularly preferably 1% or less.

<Production Process of Multi-Layer Film>

The multi-layer film of the present invention may be produced by a conventionally known process. Examples of the process include one in which all layers are formed separately and then laminated together or thermally compression bonded together, one in which one layer film formed in advance is used as a substrate and both sides of the substrate are coated to form the other layers, and one in which resin layers are laminated together by co-extrusion. The multi-layer film of the present invention is most preferably produced by the co-extrusion process out of these from the viewpoints of economic efficiency and production stability.

That is, the multi-layer film of the present invention can be produced by co-extruding a molding material A for the layer A, a molding material B-1 for the layer B-1 and a molding material B-2 for the layer B-2.

The co-extrusion process is a process for obtaining a multi-layer film by melt extruding the molding material A, the molding material B-1 and the molding material B-2 by using different extruders and laminating together these extruded products by using a feed block or multi-manifold die. This process makes it possible to control the total thickness and thickness constitution of the obtained multi-layer film by adjusting the extrusion rates of these extruders, the film forming speed and the die lip interval.

In the case of the co-extrusion process, after a molten resin from the die is cooled with a cooling roll, it is rolled up to produce a film. In the present invention, a protection film may be attached to the multi-layer film to be rolled up. Particularly when the acrylic resin does not contain rubber particles, it may be difficult to roll up the film directly due to the unsatisfactory slipperiness of the surface. In this case, it is preferred to attach the protection film to the multi-layer film to roll it up. A known protection film such as a polyethylene-based or polypropylene-based film may be used. When the acrylic resin contains rubber particles and the surface slipperiness of the obtained multi-layer film is satisfactory, the multi-layer film can be rolled up directly without using the protection film.

[Decorative Molding Film]

The decorative molding film of the present invention is a film obtained by decorating one side of the above-mentioned multi-layer film.

Examples of the decorating method include the formation of a pattern layer by printing, the formation of a thin film layer of a metal or a metal oxide, and a combination of these.

As the printing method for forming a pattern layer, a known printing method such as gravure printing, plate printing, flexographic printing, dry offset printing, pat printing or screen printing may be used according to the shape of a product and printing purpose. Examples of the method for forming a thin film layer of a metal or a metal oxide include deposition, spraying and plating methods. Examples of the deposition method include vacuum deposition, sputtering, ion plating, thermal CVD, plasma CVD and optical CVD. Examples of the spraying method include atmospheric plasma spraying and low-pressure plasma spraying. Examples of the plating method include electroless plating, melt plating and electroplating. Out of these, the deposition method makes it easy to form a metal layer and is preferably used from the viewpoints of quality and environment.

A viscous layer or an adhesive layer may be further formed on a film produced by decorating one side of the multi-layer film. The viscous layer or the adhesive layer improves adhesion between an object to be decorated and the decorative molding film during thermoforming. In the case of vacuum forming or pressure forming, the decorated surface is often on the side of the object to be decorated and therefore, the viscous layer and the adhesive layer are preferably formed on the decorated surface of a base film. A heat sensitive or pressure sensitive adhesive or bonding agent which is suitable for the materials of the base film and the object to be decorated can be used. When the film has a viscous layer or an adhesive layer, it is generally provided while a release film is attached thereto.

The surface opposite to the object to be decorated of the decorative molding film of the present invention may be subjected to various surface treatments such as hard coating, water or oil repelling coating, ultraviolet absorption coating, infrared absorption coating and metal deposition coating.

[Decorative Molded Body]

The decorative molded body of the present invention includes a substrate and the above-mentioned decorative molding film formed on the surface of the substrate. The substrate is a molded body having the shape of a part which will be described hereinafter. The substrate is made of a resin such as thermoplastic resin or a thermosetting resin.

Examples of the decorative molded body include auto interior materials, auto indicator panels, electric appliances, cosmetic cases, building interior and exterior parts, cases for equipment, products and miscellaneous goods, switches, keys, key pads, handles, levers, buttons, and housings and exterior parts for personal computers, cell phones and mobile equipment which are home electric appliances and AV equipment. These decorative molded bodies are excellent in the transferability of a decorative layer, have high surface hardness and excellent weather resistance and heat resistance, and are useful as products such as electronic and electric equipment, car parts, mechanical parts, construction materials, agricultural and fishery materials, shipping containers, packaging containers and miscellaneous goods.

The decorative molded body can be obtained by carrying out the conventionally known molding of the decorative molding film to produce the decorative molded product on the surface.

The molding method is an in-mold decoration injection molding method such as an insert mold forming method in which a decorative molding film vacuum molded in accordance with an injection mold in advance is set in a mold and a molten resin is injected into the mold to weld the film to a product simultaneously with injection molding.

Further, although decoration is carried out in an injection mold, the decorative molding film is attached to the cavity side of the mold under vacuum and bonded to a molded body by heat and pressure simultaneously with injection molding. A method in which lamination is carried out by vacuum forming or pressure forming may also be employed. When the decorative molding film is injection molded at the same time in a decoration method in an injection mold, an in-mold transfer molding method in which only a decorative layer is transferred to a molded body is also preferably used.

As the means of heating the decorative molding film during thermoforming may be used an infrared heater, electric heater, high-frequency induction, halogen lamp, microwaves, high-temperature derivative (such as steam) or laser.

EXAMPLES

The following examples are provided for the purpose of further illustrating the present invention but are in no way to be taken as limiting. Physical properties were measured by the following methods in Examples and Comparative Examples.

(1) Viscosity Average Molecular Weight of Polycarbonate

The viscosity average molecular weight (M) of a polycarbonate was obtained by measuring the intrinsic viscosity (η) of a methylene chloride solution having a concentration of 0.7 g/dL at 20° C. and inserting it into the following equation.

$$\eta_{sp}/c=[\eta]+0.45\times[\eta]^2c\text{ ([}\eta\text{] is an intrinsic viscosity)}$$

$$[\eta]=1.23\times10^{-4}M^{0.83}$$

$$c=0.7$$

(2) Glass Transition Temperature (Tg)

This was measured at a temperature elevation rate of 20° C./min by using the 2920 DSC of TA Instruments to obtain a fall point.

(3) Total Thickness of Multi-Layer Film

This was measured with the electronic micro-film thickness meter of Anritsu Corporation as a value of the center part in the width direction of a film.

(4) Thickness Constitution of Multi-Layer Film

This was measured by observing the section of a film with the VA-9710 laser microscope of Keyence Corporation. This is a value of the center part in the width direction of the film.

(5) Light Transmittance and Haze of Film

These were measured by using the NDH-5000 haze meter of Nippon Denshoku Industries Co., Ltd.

(6) Surface Hardness of Film

The pencil hardness of the film was measured in accordance with JIS K 5600.

(7) Heat Shrinkage Factor

The film was cut to a size of 200 mm×50 mm to draw a 100.0 mm bench mark in the center part with a precision ruler (minimum graduation of 0.5 mm) (reading up to a unit of 0.25 mm). The obtained piece was heated in an oven at 140° C. for 90 seconds to measure the change rate of the bench mark as heat shrinkage factor.

$$\text{Heat shrinkage factor (\%)}=(100.0-\text{length of bench mark after heating})/100.0\times100$$

(8) Trimming Properties

A decorative molded body having an extra part of the film protruding 30 mm from the end face at the periphery of the molded body was manufactured by an insert molding method. The trimming properties were judged according to whether this extra part of the film could be easily removed by bending it manually and further whether it could be removed without leaving burrs on the end face of the molded body when the film was trimmed.

○: extra part of the film can be easily removed by bending it manually and further no burrs are left on the substrate side.

X: extra part of the film cannot be easily removed by bending it manually and burrs are left on the substrate side.

Example 1

(Molding Material A)

A polycarbonate resin pellet (Panlite AD5503 of Teijin Chemicals Ltd., viscosity average molecular weight of 15,200) was prepared.

(Molding Materials B-1 and B-2)

An acrylic resin (PLEXIGLAS8N (8N) of Degussa AG) was prepared as the molding material B-1 for the layer B-1 and the molding material B-2 for the layer B-2.

(Co-Extrusion)

The molding material A and the molding materials B-1 and B-2 were each extruded from a T die having a width of 650 mm in accordance with feed-block system at cylinder temperatures of 240° C. (molding material A) and 250° C. (molding materials B-1 and B-2) by means of respective single-screw extruders having a screw diameter of 40 mm, one side of the resulting molten resin was brought into contact with a cooling roll to be cooled, and edge trimming was carried out to produce a multi-layer film having a three-layer structure consisting of layer B-1, layer A and layer B-2 and a width of 400 mm. A polyethylene-based protection film having low adhesion was used to roll up this multi-layer film.

The total thickness of the obtained multi-layer film was 125 μm, and the thickness ratio of layer B-1, layer A and layer B-2 was 48/27/50 (μm). The thickness of the layer A accounted for 22% of the total thickness. These values are the values of the center part in the width direction of the film, and the thickness nonuniformity in the width direction was ±3 μm. When the distribution in the width direction of thickness constitution was measured, the film was highly uniform in thickness with a thickness nonuniformity of ±2 μm or less in each layer. The total light transmittance, haze and surface hardness of the film are shown in Table 1. The multi-layer film had a very low heat shrinkage factor of 0.50% and such high brittleness that it was easily trimmed.

Example 2

Film formation was carried out to obtain a multi-layer film having a total thickness of 129 μm and a layer A whose thickness accounted for 11% of the total thickness in the same manner as in Example 1 except that the thickness ratio of the layer A and the take-up speed were changed. The physical properties of the film are shown in Table 1. The heat shrinkage factor and trimming properties were satisfactory as in Example 1.

Example 3

Film formation was carried out to obtain a multi-layer film having a total thickness of 73 μm and a layer A whose thickness accounted for 10% of the total thickness in the same manner as in Example 1 except that the thickness ratio of the layer A and the take-up speed were changed. The physical properties of the film are shown in Table 1. The heat shrinkage factor and trimming properties were satisfactory as in Example 1.

Example 4

Film formation was carried out to obtain a multi-layer film having a total thickness of 123 μm and a layer A whose thickness accounted for 15% of the total thickness in the same manner as in Example 1 except that the molding material A was changed to the Panlite L1225JM of Teijin Chemicals Ltd. (viscosity average molecular weight of 18,500) and the thickness ratio of the layer A and the take-up speed were changed. The physical properties of the film are shown in Table 1. The heat shrinkage factor and trimming properties were satisfactory as in Example 1.

Example 5

Film formation was carried out to obtain a multi-layer film having a total thickness of 75 μm and a layer A whose thickness accounted for 16% of the total thickness in the same manner as in Example 4 except that the molding materials B-1 and B-2 were changed to an acrylic resin (Acrypet VH001 of Mitsubishi Rayon Co., Ltd.) and the thickness ratio of the layer A and the take-up speed were changed. The physical properties of the film are shown in Table 1. The heat shrinkage factor and trimming properties were satisfactory as in Example 1.

Comparative Example 1

Film formation was carried out to obtain a multi-layer film having a total thickness of 128 μm and a layer A whose thickness accounted for 20% of the total thickness in the same manner as in Example 1 except that the molding material A was changed to the Panlite L-1250 of Teijin Chemicals Ltd. (viscosity average molecular weight of 23,700) and the thickness ratio of the layer A and the take-up speed were changed. The physical properties of the film are shown in Table 1. The film had a high viscosity average molecular weight and such high ductility that it was hardly broken, thereby making it difficult to trim it.

Comparative Example 2

Film formation was carried out to obtain a multi-layer film having a total thickness of 125 μm in the same manner as in Example 1 except that the thickness ratio of the layer A and the take-up speed were changed. As for the thickness constitution, the ratio of the layer B-1/layer A/layer B-2 was 40/45/40 (μm), and the thickness of the layer A accounted for 36% of the total thickness. The physical properties of the film are shown in Table 1. The film had such high ductility that it was hardly broken, thereby making it difficult to trim it.

Comparative Example 2

Film formation was carried out to obtain a multi-layer film having a total thickness of 113 μm in the same manner as in Example 1 except that the molding materials B-1 and B-2 were changed to an acrylic resin (Acrypet VH001 of Mitsubishi Rayon Co., Ltd.) and the thickness ratio of the layer A and the take-up speed were changed. As for the thickness constitution, the ratio of the layer B-1/layer A/layer B-2 was 26/63/24 (μm), and the thickness of the layer A accounted for 56% of the total thickness. The physical properties of the film are shown in Table 1. The film had such high ductility that it was hardly broken, thereby making it difficult to trim it.

Comparative Example 4

An acrylic film having a width of 400 mm was obtained in the same manner as in Example 1 after an acrylic resin (Acrypet VH001 of Mitsubishi Rayon Co., Ltd.) was extruded from a T die having a width of 650 mm at a cylinder temperature of 250° C. by means of a single-screw extruder having a screw diameter of 40 mm in accordance with single-layer system and not feed block system. The physical properties of the film are shown in Table 1. The film had high haze, a high heat shrinkage factor and low heat resistance.

TABLE 1

| | Layer A | | layers B-1 and B-2 | | layer constitution | |
|---|---|---|---|---|---|---|
| | Polycarbonate Molecular weight Mv | glass transition temperature ° C. | trade name of acrylic resin | total thickness μm | layer B-1/layer A/layer B-2 μm/μm/μm | ratio of layer A % |
| Example 1 | 15,200 | 141 | 8N | 125 | 48/27/50 | 22 |
| Example 2 | 15,200 | 141 | 8N | 129 | 58/14/57 | 11 |
| Example 3 | 15,200 | 141 | 8N | 73 | 33/7/33 | 10 |
| Example 4 | 18,500 | 145 | 8N | 123 | 52/18/53 | 15 |
| Example 5 | 18,500 | 145 | Acrypet VH001 | 75 | 32/12/31 | 16 |
| Comparative Example 1 | 23,700 | 145 | 8N | 128 | 49/25/54 | 20 |
| Comparative Example 2 | 15,200 | 141 | 8N | 125 | 40/45/40 | 36 |

TABLE 1-continued

| | | | | | | |
|---|---|---|---|---|---|---|
| Comparative Example 3 | 15,200 | 141 | Acrypet VH001 | 113 | 26/63/24 | 56 |
| Comparative Example 4 | — | — | Acrypet VH001 | 117 | — | — |

| | Total light transmittance % | haze % | surface hardness | heat shrinkage factor % | trimming properties |
|---|---|---|---|---|---|
| Example 1 | 92 | 0.2 | 2H | 0.5 | ○ |
| Example 2 | 92 | 0.1 | 2H | 0.5 | ○ |
| Example 3 | 92 | 0.1 | F | 0.75 | ○ |
| Example 4 | 92 | 0.2 | 2H | 0.25 | ○ |
| Example 5 | 92 | 0.1 | F | 0.5 | ○ |
| Comparative Example 1 | 92 | 0.3 | 2H | 0.25 | X |
| Comparative Example 2 | 92 | 0.2 | H | 0 | X |
| Comparative Example 3 | 91 | 0.2 | F | 0.25 | X |
| Comparative Example 4 | 92 | 1 | H | 5 | ○ |

Effect of the Invention

The multi-layer film of the present invention is excellent in heat resistance, trimming properties, surface hardness and heat shrinkage factor. According to the production process of the present invention, a multi-layer film having the above excellent characteristic properties can be produced.

INDUSTRIAL APPLICABILITY

The multi-layer film of the present invention is useful as a decorative molding material.

The invention claimed is:

1. A multi-layer film comprising;

a layer A containing a polycarbonate resin having a viscosity average molecular weight of 13,000 or more to less than 20,000; and a layer B-1 and a layer B-2 each containing an acrylic resin and formed on both sides of the layer A, respectively, wherein a total thickness of the multi-layer film is 50 to 200 μm, and a thickness of the layer A accounts for 5 to 25% of the total thickness.

2. The multi-layer film according to claim 1 having a haze of 4% or less.

3. A decorative molding film obtained by decorating one side of the multi-layer film of claim 1.

4. A decorated molded body comprising a substrate and the decorative molding film of claim 3 which is formed on a surface of the substrate.

5. A decorative molding film obtained by decorating one side of the multi-layer film of claim 2.

6. A decorated molded body comprising a substrate and the decorative molding film of claim 5 which is formed on a surface of the substrate.

7. A process of producing the multi-layer film of claim 1 having layers B-1 and B-2 on both sides of the layer A, respectively, comprising the step of: coextruding a molding material A which constitutes the layer A and contains a polycarbonate resin having a viscosity average molecular weight of 13,000 or more to less than 20,000, a molding material B-1 which constitutes the layer B-1 and contains an acrylic resin and a molding material B-2 which constitutes the layer B-2 and contains an acrylic resin.

* * * * *